(12) United States Patent
Hopeck et al.

(10) Patent No.: US 6,280,265 B1
(45) Date of Patent: Aug. 28, 2001

(54) ELECTRICAL CONNECTION BETWEEN AND A METHOD OF INSTALLATION OF A MAIN TERMINAL AND A BORE COPPER OF A DYNAMOELECTRIC MACHINE

(75) Inventors: James Frederick Hopeck, Mechanicville; Marcus Edward Harrington, Clifton Park; Steven William Jones, Delanson; Patrick Brian Douglass, Amsterdam, all of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/366,857

(22) Filed: Aug. 4, 1999

(51) Int. Cl.$^7$ ........................................................ H01R 4/48
(52) U.S. Cl. ............................. 439/843; 310/71; 439/827
(58) Field of Search ....................... 439/843, 827, 439/825, 655, 824, 851–857; 310/71, 260–262, 214, 215, 270, 105

(56) References Cited

U.S. PATENT DOCUMENTS

| | | | |
|---|---|---|---|
| 4,299,431 | * 11/1981 | Wilson et al. | 439/281 |
| 5,358,432 | 10/1994 | Shih et al. | 439/825 |

* cited by examiner

*Primary Examiner*—Brian Sircus
*Assistant Examiner*—Son V. Nguyen
(74) *Attorney, Agent, or Firm*—Nixon & Vanderhye

(57) ABSTRACT

A longitudinally-extending bore connector has apertures which receive annular spring electrical connectors. To connect end turns to the bore connector, a main terminal having a prefabricated and preassembled gooseneck at its radially outer end is inserted in a radial bore to locate its distal end in the first aperture of the bore connector forming an electrical connection. The gooseneck at the radially outer end of the main terminal comprises preassembled leaves connected to the main terminal prior to assembly in the machine and connected to the end turn upon installation. A nut on the main terminal is threaded down to secure the main terminal to the shaft. A stud is similarly inserted into a second aperture of the connector bore and electrically connected thereto and to an exciter/slip ring assembly.

11 Claims, 4 Drawing Sheets

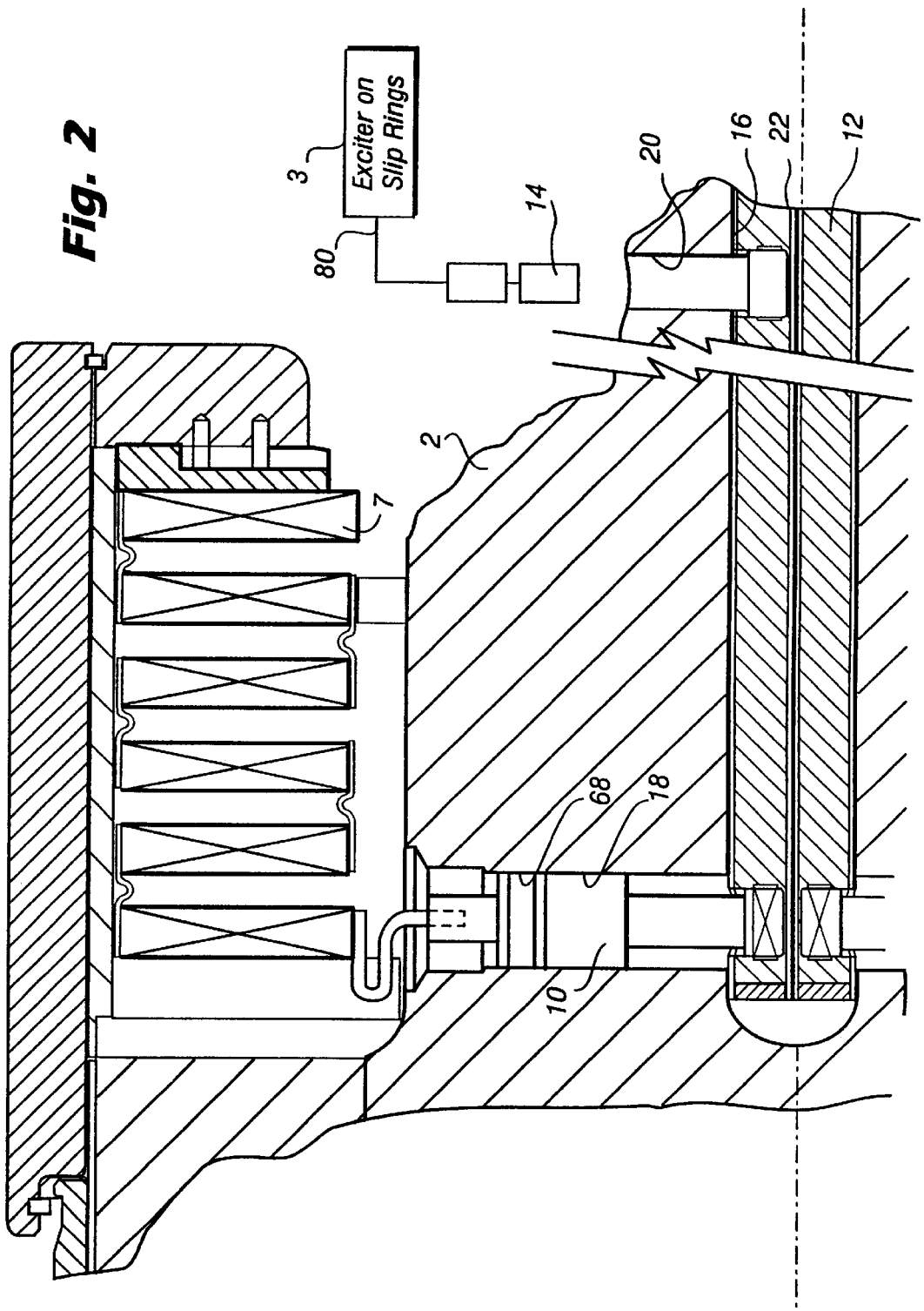

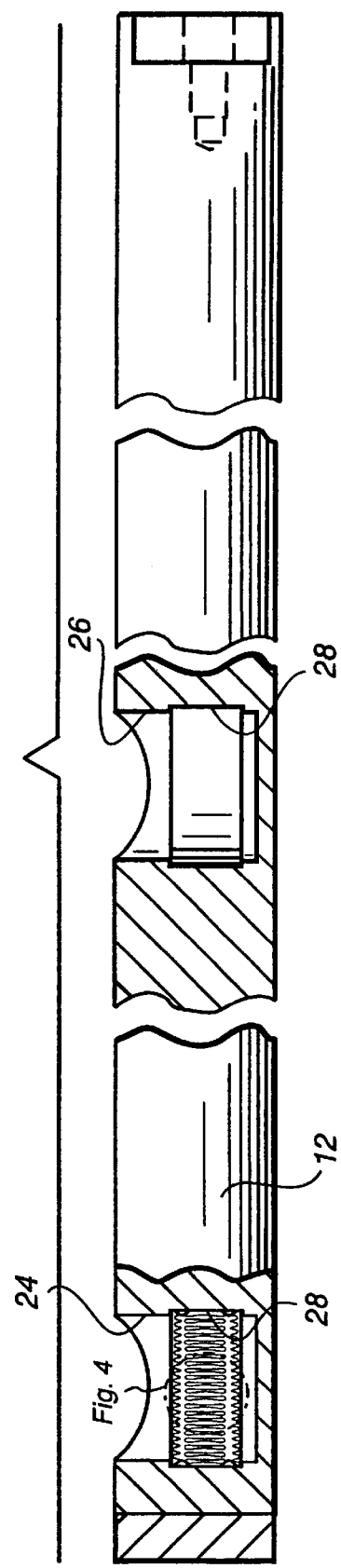
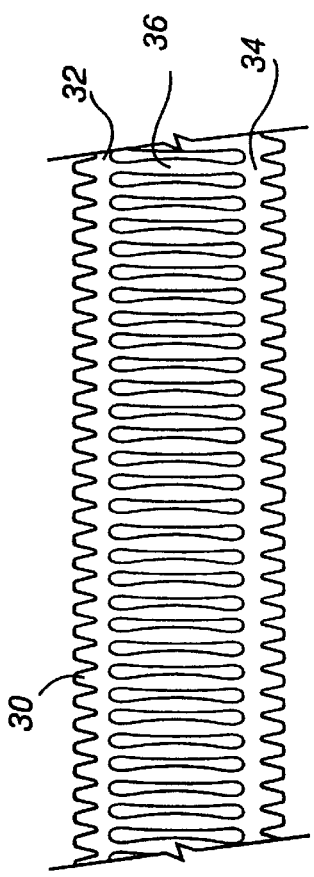

ELECTRICAL CONNECTION BETWEEN AND A METHOD OF INSTALLATION OF A MAIN TERMINAL AND A BORE COPPER OF A DYNAMOELECTRIC MACHINE

BACKGROUND OF THE INVENTION

The present invention relates to connections between and methods of connecting field windings and exciter or slip rings in dynamoelectric machines and particularly relates to current carrying connections between and methods of connecting field windings and bore connectors and bore connectors and exciter or slip rings.

The rotors of dynamoelectric machines conventionally typically comprise relatively large diameter cylindrical bodies containing field windings for producing magnetic flux which in turn produces stator current and voltage. These field windings are normally carried in a series of longitudinal slots along the outer circumference and extend the length of the rotor body. Rotation of the body particularly at speeds of 3600 rpm, for example, exerts high centrifugal forces on the windings which are retained in the rotor slots through the use of dovetail shaped wedges which also extend along the length of the rotor body. The manner in which the windings and rotor slots are shaped, insulated and cooled present formidable design problems, particularly for units designed for long term operation under variable load and environmental conditions. Because the windings extend axially beyond the rotor body and wedge ends and are subjected to the same rotational forces which tend to thrust the winding end turns in a radially outward direction, specially designed structure must be included to prevent such radial movement, as well as for making electrical connections between the exciter or slip rings, for example, and the windings.

As to the problem of preventing radial movement of the end turns, it is conventional to enclose the winding end turns within retaining rings attached to the rotor body ends by shrink fitting such rings around circumferential lips at the ends of the rotor body. Other means, such as locking keys and the like, are additionally included to maintain the retaining rings securely on the rotor so as to counteract the effects of thermal expansion on the retaining rings.

As to the manner in which electrical connections may be made between the windings and bore connectors, also known as the "bore copper" (insulated conductors embedded in the smaller diameter shafts that extend from opposite ends of the rotor body, and which are ultimately connected to the exciter/rectifier assembly), such field winding connections as found in the prior art are conventionally brazed leaves of copper of various configurations. These configurations have exhibited premature failures due to cyclic mechanical and electrical duty requirements, which require the connectors to have particular characteristics.

More particularly, in a current long-standing design affording electrical connection between a field winding and a bore conductor (see, for example, U.S. Pat. No. 5,358, 432), a main terminal is inserted into a radial bore of the shaft. The main terminal has tapered threads at its radial inner end for engaging female tapered threads in the bore connector. Tolerances of the taper angle, thread pitch, the contacts along minimum major and minor threaded diameters and the need to torque the main terminal to a predetermined value render the installation of the main terminal to bore connector connection difficult as well as affording less than optimal conditions for good electrical connection. The opposite end of the main terminal includes a plurality of flexible leaves which are typically electrically connected to the field winding. Because of the pipe thread type securement between the main terminal and bore connector, the thin terminal leaves are necessarily formed and brazed together in the field. In that process, care must be taken not to melt the necessary thin copper leaves or to allow the brazing alloy to migrate into the flexible part of the terminal. Field brazing of the leaves to one another and to the field winding is time consuming and laborious. Should the leaves melt in the course of brazing or should braze alloy migrate to the flexible part of the terminal, the high rotational and thermal forces of the rotor will cause the flexible connection to prematurely fail causing unscheduled outages and generator down time.

The bore connector to exciter/slip ring connections are conventionally similarly formed with a tapered pipe thread at the end of a stud for threaded connection with the tapered female threads in a second aperture of the bore conductor. The stud forms the electrical connection between the bore connector and the exciter/slip rings. Similar installation and cyclic duty problems occur in this connection as in the previously-described electrical connection. Consequently, there is a need to provide an improved electrical connection between the field windings and the exciter/slip ring connections which can be bench assembled with a precise configuration and braze solidification and can be inspected prior to assembly to the generator in the field and which eliminates the above-described threaded connections between the bore connector and the main terminal and stud as well as eliminate the torquing requirements.

BRIEF SUMMARY OF THE INVENTION

To accomplish the foregoing and in a preferred embodiment of the present invention, a main terminal is bench assembled for subsequent installation and connection between the bore connector and a field winding. More particularly, the main terminal includes at its proximal end a plurality of leaves having portions precisely brazed together prior to installation in the dynamoelectric machine and without migration of brazing material into the flexible portion of the leaves. The opposite distal end of the main terminal is smooth and unthreaded. The bore connector includes a first aperture in which is received an electrical connector. Preferably the electrical connector is of an annular torsion spring louver type, and which connector is received within a groove within the aperture. To connect the preassembled main terminal with the bore connector, the main terminal is inserted through a radial bore of the shaft and its radial inner end is received within the spring-biased annular electrical connector in the aperture of the bore connector. It comprises a simple insertion procedure without regard to orientation of the main terminal about its axis. A nut is preferably provided about the main terminal and screw threads into female threads in the radial bore of the shaft to bear against a shoulder on the main terminal thus retaining the main terminal within the radial bore. The leaves brazed to one another can then be brazed to the field winding. A similar arrangement is provided for the electrical connection between the bore connector and the exciter/slip rings. Thus the stud which forms that connection can be inserted into a second aperture and secured to the shaft similarly as previously described.

In a preferred embodiment according to the present invention, there is provided in a dynamoelectric machine having a shaft, a bore connector extending generally in an axial direction along a portion of the shaft and having a generally radially outwardly opening aperture, a main terminal extending within a radial bore in the shaft and having radial inner and outer ends, the radial outer end including a flexible electrical connection for connection with a field winding of the machine, an annular spring disposed in the aperture, the inner radial end of the main terminal being received within the aperture with the spring between the radial inner end and the bore connector affording electrical connection therebetween, and a retainer engaging the shaft and the main terminal maintaining the main terminal in the radial bore and the inner end thereof in electrical contact with the bore connector In a further preferred embodiment according to the present invention, there is provided in a dynamoelectric machine having a shaft and a bore, a radial bore connector extending generally in an axial direction along a portion of the shaft and having a generally radially outwardly opening aperture and a main terminal, a method of connecting the bore connector and a field winding comprising the steps of, prior to electrically connecting the bore connector and field winding, brazing a plurality of leaves to one another and to one end of the main terminal, inserting the main terminal into the radial bore and an opposite end of the main terminal into the aperture, securing the main terminal in the radial bore and securing the brazed leaves to the field winding.

BRIEF DESCRIPTION OF THE DRAWINGS

FIG. 2 is an enlarged fragmentary cross-sectional view illustrating a field winding to exciter/slip rings electrical connection in accordance with a preferred embodiment of the present invention for use in a dynamoelectric machine as illustrated, for example, in FIG. 1;

FIG. 3 is an enlarged side elevational view with portions broken out and in cross-section illustrating a bore connector according to the present invention;

FIG. 4 is an enlarged plan view of an electrical connector laid out in a flat plane and which connector is employed within the bore connector.

DETAILED DESCRIPTION OF THE INVENTION

Figure 1:
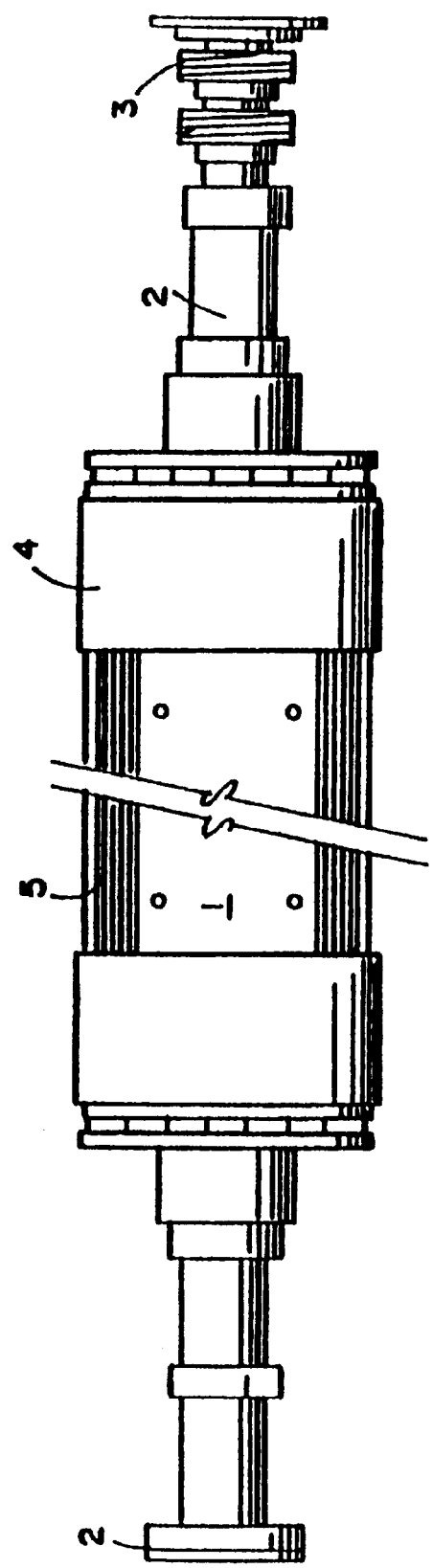
FIG. 1 schematically illustrates a conventional rotor for an dynamoelectric machine.

Referring to the drawings, particularly FIG. 1, there is illustrated a rotor 1 for an electrodynamic machine such as a generator. The rotor 1 includes a shaft 2 which contains insulated conductors, i.e., bore connectors or "bore copper" which extend longitudinally along the end shafts 2 between the exciter/slip rings 3 and the rotor field windings located on the rotor within the retaining rings 4. As will be appreciated and is conventional, the rotor body includes a series of longitudinal radially-opening slots 5 having dovetail-shaped, longitudinal grooves in the slot sides adjacent the periphery of the rotor. Field windings are inserted in the slots and extend the length of the rotor body with longitudinal wedges, not shown, located in the dovetail-shaped grooves for holding the windings in place against centrifugal forces exerted when the rotor is at operational speed. The longitudinal sections of the windings extend in an axial direction beyond the ends of the larger diameter portion 1 of the rotor and include end turns 7 (FIG. 2) for connecting a longitudinal section of one slot with a winding of another slot. The retaining ring 4 overlies the end turns and resists the centrifugal forces on the winding end turns when the rotor is at operational speed so as to restrain the end turns from moving in a radially-outwardly direction.

Referring now to FIG. 2, an electrical connection is effected between an end turn 7 and the exciter/slip rings 3, a pair of such electrical connections being provided for a two-pole machine. Each electrical connection includes a main terminal 10, a bore connector or bore copper 12 and a stud 14 for electrically connecting the end winding 7 and the exciter/slip rings 3. It will be appreciated as seen in FIG. 2 that the bore connector 12 lies in a longitudinally-extending bore 16 at the end of the shaft, while the main terminal 10 and stud 14 lie in radially extending bores 18 and 20, respectively.

Referring to FIG. 3, each bore connector 12 includes an elongated conductor having a generally semi-cylindrical cross-section within electrical insulation 22 (FIG. 2). Each bore connector 12 also includes first and second apertures 24 and 26, respectively, adjacent opposite ends. Each aperture 24 and 26 includes an enlarged diameter groove 28 intermediate the height of the aperture. A spring-biased multi-contact connection strip or electrical connector 30 is disposed in each of the grooves 28. The multi-contact connection strip comprises an electrical connector of conventional construction having marginal or peripheral bands 32 and 34 between which are spring louvers 36. In FIG. 4 the electrical connector 30 is shown in a rolled out planar configuration. It will be appreciated that when the connector 30 is disposed in the groove 28, the connector forms an annular spring with the margins 32 and 34 extending inwardly of the groove 28 and of the apertures 24 and 26, respectively for purposes of affording electrical connection between the main terminal and the bore connector 12.

Figure 5:
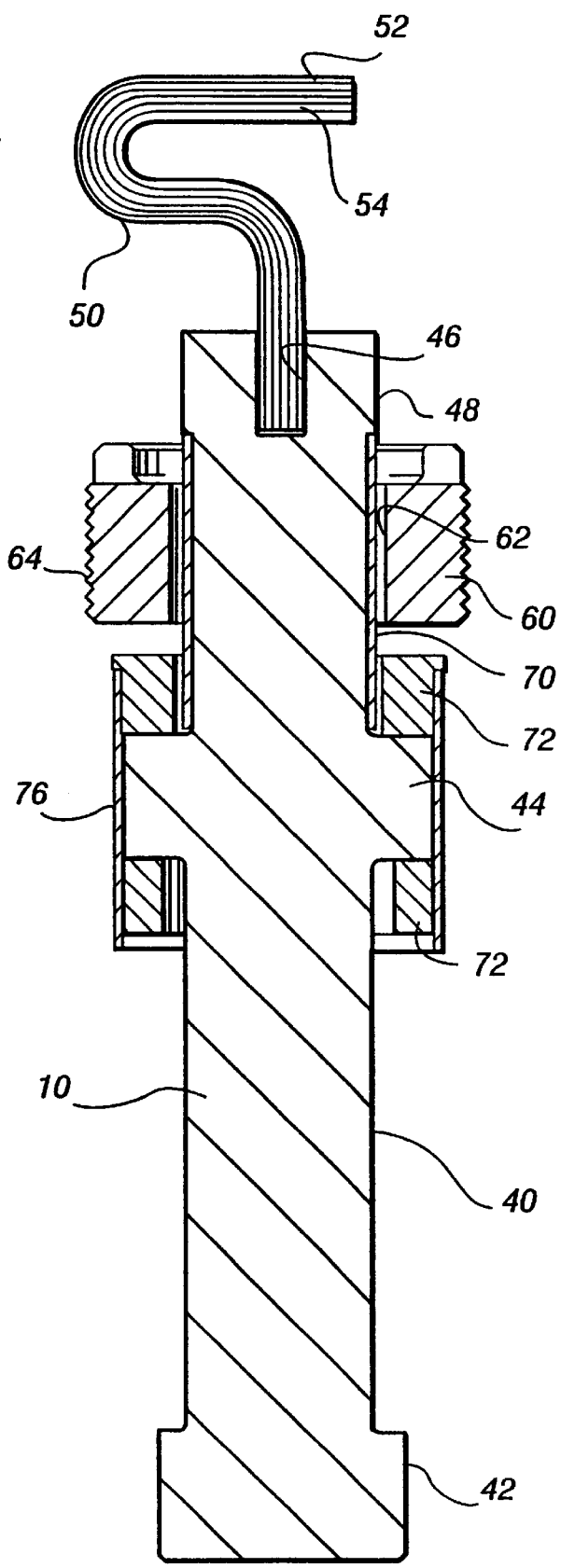
FIG. 5 is an enlarged cross-sectional view of a main terminal constructed in accordance with the preferred embodiment of the present invention for connecting the field winding and bore connector.

Referring to FIGS. 2 and 5, the main terminal 10 includes an elongated generally cylindrical body or sleeve 40 having a diametrically enlarged distal end portion 42, an intermediate diametrically enlarged portion 44, and a diametrically extending slot 46 at its proximal end 48. A gooseneck 50 is provided on the main terminal 10 with the distal end of the gooseneck 50 engaging in slot 46 and its proximal end 52 extending for electrical connection with an end turn 7. The gooseneck 50 is formed of a plurality of leaves 54, for example, copper leaves, brazed one to the other, to form a flexible connection between the main terminal and an end turn. The leaves, for example, are formed of very thin copper material and a substantial number of the leaves, for example, are brazed one to the other to form the gooseneck electrical connection on the main terminal 10 for electrically connecting the end turn and the terminal.

A nut 60 having an enlarged diameter interior opening 62 extends about the main terminal 10 above or radially outwardly of the intermediate portion 44. The nut 60 has external threads 64 for threaded engagement with female threads 68 (FIG. 2) in the radial bore 18. Electrical insulation 70 surrounds the main terminal above portion 44. Additionally, annular insulators 72 are provided on opposite sides of the intermediate portion 44 and annular insulating material 76 is provided about intermediate portion 44. Consequently, when the main terminal is inserted into the radial bore 18 and the nut 60 is threaded to engage the intermediate portion 44 to maintain the main terminal in the radial bore 18, the nut 60 is electrically insulated from the main terminal 10.

The stud 14 may be similarly constructed as the main terminal 10 for reception in the second aperture 26. The stud 14 has an electrical connection as illustrated schematically at 80 for electrically connecting the stud 14 and the exciter/slip rings 3.

It will be appreciated that the main terminal 10 is completely fabricated, i.e., completely bench manufactured, tested and quality inspected prior to installation into the machine. Consequently, all of the leaves 54 are brazed one to the other and brazed to the proximal end 48 of the main terminal 10 prior to assembly in the machine. This eliminates field assembly of the leaves 54 particularly including the clamping, heating, solidification, brazing of the leaves to one another and to the main terminal in the field. Moreover, the pre-installation assembly of the main terminal and the substitution of a socket-type connection between the distal end of the main terminal 10 and the first aperture 26 of the bore connector 12 eliminates the problems associated with employing the tapered threaded connection as in the prior art. See, for example, U.S. Pat. No. 5,358,432.

To install the main terminal 10 in the machine, the main terminal 10 is inserted such that the distal end 42 is received within the first aperture 24 and within the electrical connector 30 within the large diameter groove of the bore 24. The electrical connector 30 affords a resilient spring connection with the distal end of the main terminal. It is noted that the main terminal is simply inserted radially into the bore 18 and into the socket formed by the aperture 24 and connector 30 and need not be rotationally oriented. The nut 60 is then threaded down to secure the main terminal in the radial bore 18 with its distal end 42 in electrical connection with the bore connector 12. The gooseneck 50 can then be brazed to the end turn 7. A similar type of installation may be provided for connecting the bore connector 12 to the exciter/slip rings 3 by employing stud 14. Similarly, as the main terminal, the stud 14 is inserted radially into the radial bore 20 and its distal end is received in the aperture 26 containing an electrical connector 30 thereby affording excellent electrical connection between the stud 14 and bore connector 12. The connections to the exciter/slip rings 3 can then be readily made.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a dynamoelectric machine having a shaft, a bore connector extending in an axial direction along a portion of said shaft and having a radially outwardly opening aperture, having an annular groove a main terminal extending within a radial bore in said shaft and having radial inner and outer ends, said radial outer end including a flexible electrical connection for connection with a field winding of the machine, an annular spring disposed in said aperture groove, said inner radial end of said main terminal being received within said aperture with said spring between said radial inner end and said bore connector affording electrical connection therebetween, and a retainer engaging said shaft and said main terminal maintaining said main terminal in said radial bore and said inner end thereof in electrical contact with said bore connector.

2. A dynamoelectric machine according to claim 1, wherein said annular spring comprises a pair of laterally spaced annular end strips connected by a plurality of spaced louver elements.

3. A dynamoelectric machine according to claim 1, wherein said retainer includes a male threaded nut engaging female threads in said radial bore, said nut engaging a shoulder on said main terminal to secure the main terminal to said shaft.

4. A dynamoelectric machine according to claim 1 including electrical insulation about portions of said main terminal electrically insulating the main terminal and the shaft.

5. A dynamoelectric machine according to claim 1, wherein said aperture lies adjacent one end of said bore connector, said bore connector having a radial outwardly open aperture adjacent an opposite end thereof, a second annular spring disposed in said second aperture and a stud having one end disposed in said second aperture with said second spring between said one stud end and said bore connector for electrically connecting said bore connector and exciter or slip rings electrically coupled to said stud.

6. In a dynamoelectric machine having a shaft and a radial bore, a bore connector extending generally in an axial direction along a portion of said shaft and having a radially outwardly opening aperture and a main terminal, a method of connecting the bore connector and a field winding comprising the steps of:

prior to electrically connecting the bore connector and field winding, brazing a plurality of leaves to one another and to one end of the main terminal;

inserting said main terminal into said radial bore and an opposite end of said main terminal into said aperture;

securing said main terminal in said radial bore; and securing said brazed leaves to the field winding.

7. A method according to claim 6, including disposing an annular spring within said aperture and engaging said opposite end of said main terminal within said spring to form an electrical connection between said main terminal and said bore connector.

8. A method according to claim 6, wherein the step of inserting includes inserting said main terminal into said radial bore in a generally radial direction.

9. A method according to claim, 6, wherein the step of inserting includes inserting said main terminal into said radial bore substantially without rotation of said main terminal relative to said bore connector.

10. A method according to claim 6 wherein said bore connector has a second radially outwardly opening aperture and said shaft has a second radial bore, and including the steps of inserting a stud through said second bore and into said second aperture and connecting said stud with exciter/slip rings.

11. A method according to claim 6, wherein said step of securing said main terminal in said radial bore includes threading a male threaded retainer nut along female threads in said radial bore to engage a shoulder on said main terminal thereby to secure the main terminal to said shaft.

* * * * *